United States Patent [19]

Okamoto et al.

[11] Patent Number: 4,990,569
[45] Date of Patent: Feb. 5, 1991

[54] RUBBER-MODIFIED STYRENE RESIN COMPOSITION

[75] Inventors: Yasushi Okamoto; Tetsuo Uno, both of Chiba, Japan

[73] Assignee: Sumitomo Chemical Company, Ltd., Osaka, Japan

[21] Appl. No.: 223,599

[22] Filed: Jul. 25, 1988

[30] Foreign Application Priority Data

Jul. 23, 1987 [JP] Japan .............................. 62-185281
Oct. 9, 1987 [JP] Japan .............................. 62-256014
Oct. 16, 1987 [JP] Japan .............................. 62-262439
Jan. 29, 1988 [JP] Japan .............................. 63-20904

[51] Int. Cl.$^5$ ...................... C07L 47/00; C07L 51/04
[52] U.S. Cl. ..................................... 525/232; 525/84; 525/210; 525/236; 525/237; 525/289; 525/315
[58] Field of Search ................................. 525/84, 232

[56] References Cited

U.S. PATENT DOCUMENTS 4,146,589  3/1979  Dupre .
4,153,645  5/1979  Lanza .
4,493,922  1/1985  Echte et al. .
4,713,420  12/1987  Henton ............................... 525/71

Primary Examiner—Jacob Ziegler
Attorney, Agent, or Firm—Sughrue, Mion, Zinn Macpeak & Seas

[57] ABSTRACT

A rubber-modified styrene resin composition is disclosed, in which a soft component comprising an elastomer is dispersed in a resin matrix comprising a styrene resin in the form of particles, wherein:

(1) the soft component particles dispersed in the composition have an average particle size of from 0.2 to 2.6 µm;

(2) the soft component has such a particle size distribution as having two maxima, one in the range less than 0.8 µm and the other in the range not less than 0.8 µm;

(3) the elastomer is present in an amount of from 5.0 to 10.0% by weight based on the resin composition; and (4) the resin matrix has an intrinsic viscosity [η] of at least 0.65.

The resin composition exhibits markedly improved impact strength, stiffness and gloss.

6 Claims, No Drawings

RUBBER-MODIFIED STYRENE RESIN COMPOSITION

FIELD OF THE INVENTION

This invention relates to a rubber-modified styrene resin composition having improved impact strength, stiffness and gloss. More particularly, it relates to a rubber modified styrene resin composition in which the content, particle size, particle size distribution and swelling index of an elastomer to be used as a toughening agent and the viscosity of a resin matrix are controlled within specific ranges to attain markedly improved impact strength.

BACKGROUND OF THE INVENTION

It is well known that impact strength of styrene resins which are hard and brittle can be improved by blending a styrene resin with an elastomer or polymerizing a styrene monomer in the presence of an elastomer to obtain a rubber-modified styrene resin composition. However, the rubber-modified styrene resin composition is still inferior to ABS resin in impact strength.

To meet the recent demands in market for decreased cost and reduced wall thickness, it has been keenly desired to develop a rubber-modified styrene resin composition possessing impact strength equal to ABS resin.

Methods for improving impact strength of a rubber-modified styrene resin composition have so far been proposed as described, e g., in JP-A-57-172948, JR-A-57-187345, A-57-187345, JP-A-57-187346, JP-A-60-166338, JP-A-61-85461, JP-A-49-354, and JP-A-59-66412 (the term "JP-A" as used herein means an "unexamined published Japanese Patent application"). Each of these methods comprises addition of an organopolysiloxane as an impact modifier or copolymerization of monomers such as acrylonitrile and α-methylstyrene. However, such techniques involve a disadvantage of high cost incurred for purchase of an additive, installation of feeders, storage of monomers, or compounding equipments. Besides, the degrees of improvement on impact strength attained by these methods are still unsatisfactory.

Furthermore, in order to improve gloss, it is necessary to render the particle size of soft component particles comprising an elastomer and a styrene resin graft polymerized on an elastomer and occluded styrene polymer as small as possible to an extent such that it is corresponding to a wavelength of light. However, if soft component particles having a small particle size is used, the impact strength decreases. Accordingly, in the case that in order to improve the gloss, the particle size of the soft component is rendered small, though the impact strength can be generally improved by increasing the amount of the elastomer added, there is generated a defect that an increase in amount of the elastomer added leads to a reduction in stiffness.

SUMMARY OF THE INVENTION

One object of this invention is to overcome the above-described disadvantages associated with the conventional rubber-modified styrene resin compositions and to provide a rubber-modified styrene resin composition having markedly improved stiffness, gloss and impact strength without using any impact modifier.

As a result of extensive investigations, it has now been found that a distinct improvement on impact strength can be achieved by controlling the content of an elastomer, particle size, particle size distribution and swelling index of a soft component and the intrinsic viscosity of a resin matrix within the respective specific ranges. The present invention has been completed based on this finding.

The present invention provides a rubber-modified styrene resin composition in which a soft component comprising an elastomer is dispersed in a resin matrix comprising a styrene resin in the form of particles, wherein:

(1) the soft component particles dispersed in the composition have an average particle size of from 0.2 to 2.6 μm;

(2) the soft component has such a particle size distribution as having two maxima, one in the range less than 0.8 μm and the other in the range not less than 0.8 μm;

(3) the elastomer is present in an amount of from 5.0 to 10.0% by weight based on the resin composition; and (4) the resin matrix has an intrinsic viscosity $[\eta]$ of at least 0.65.

Achievement of the object of this invention requires that all of the above-described conditions (1) to (4) should be fulfilled.

DETAILED DESCRIPTION OF THE INVENTION

The rubber-modified styrene resin which can be used in the present invention can be prepared by bulk polymerization or bulk-suspension two stage polymerization of an aromatic monovinyl monomer in the presence of an elastomer.

The aromatic monovinyl monomer to be used generally includes styrene. In addition, alkyl-substituted styrenes, e.g., o-, m- or p-methylstyrene, can also be employed.

The elastomer which can be used in the present invention includes polybutadiene, styrene-butadiene copolymers, ethylene-propylene copolymers, ethylene-propylene-non-conjugated diene terpolymers, isoprene polymers, and styrene-isoprene copolymers, with polybutadiene being the most preferred. Polybutadiene may be either high-cis polybutadiene having a high cis-form content or low-cis polybutadiene having a low cis-form content.

In the rubber-dified styrene resin composition of the present invention, a soft component is dispersed in a resin matrix in the form of particles, and its particle size distribution curve has two peaks.

In the case that a maximum particle diameter in one peak having a smaller particle size is expressed by $D_1$ and that in another peak having a larger particle size is expressed by $D_2$, it is preferred that $D_1$ and $D_2$ are satisfied with the following relations:

$D_1 \leq 0.8$ μm $D_2 > 0.8$ μm $10 \leq D_2/D_1 \leq 30$

If $D_1$ exceeds 0.8 μm, the gloss is reduced, whereas if $D_2$ is not higher than 0.8 μm, the effect to resistance is lessened. Further, if the $D_2/D_1$ value is less than 10 or more than 30, the effect improve impact resistance does not appear at all or appears scarcely. The average particle size of the soft component should fall within the range of from 0.2 to 2.6 μm, preferably from 0.4 to 2.3 μm, and more preferably from 0.4 to 2.0 μm. Particle sizes either greater or smaller than the above-recited range would not only lessen the effect to improve impact resistance but also markedly reduce the gloss.

Further, it is preferred that the soft component has a particle size distribution such that particles having a particle size of 0.5 μm or less account for 30% or more but less than 70%, those having a particle size of 1 0 μm or less account for 40% or more but less than 75%, and those having a particle size of 2.5 μm or more account for 20% or more but less than 55%, respectively. If the particles having a particle size of 0.5 μm or less account for less than 30% or 70% or more, the effect to improve impact resistance does not appear at all or appears scarcely. Further, if the particles having a particle size of 1.0 μm or less account for less than 40% or 75% or more, the effect to improve impact resistance does not appear at all or appears scarcely. On the other hand, if the particles having a particle size of 2.5 μm or more account for less than 20% or 55% or more, the effect to improve impact resistance does not appear at all or appears scarcely The average particle size as referred herein can be obtained by determining a particle diameter of 500 soft component particles in a transmissive electron micrograph taken of an ultra-thin slice of the rubber-modified styrene resin and assingning the measured values to equation:

Average Particle Size $= \Sigma n_i D_i^2 / \Sigma n_i D_i$ wherein $n_i$ is a number of soft component particles having a particle diameter of $D_i$.

Since the soft component particles seen through obserservation of an electron micrograph are not of a real circle, a diameter (a) in the longitudinal direction and that (b) in a direction perpendicular to the longitudinal direction are measured, and a particle diameter (R) is calculated by the following equation.

$$R = \frac{a + b}{2}$$

Though the particle size distribution can be measured by measns of analyzing apparatus such as a Coulter counter, one must take into consideration a difference of measured values from those obtained through observation of an electron micrograph. The relation between the particle diameter $D_i$ and the range of measured values of the particle diameter R is shown in Table 1 below.

TABLE 1

| Particle Diameter $D_i$ | Range of Particle Diameter R |
|---|---|
| 0.2 μm | R < 0.25 μm |
| 0.3 μm | 0.25 μm ≦ R < 0.35 μm |
| 0.4 μm | 0.35 μm ≦ R < 0.45 μm |
| 0.5 μm | 0.45 μm ≦ R < 0.55 μm |
| . | . |
| . | . |
| . | . |
| 4.8 μm | 4.75 μm ≦ R < 4.85 μm |
| 4.9 μm | 4.85 μm ≦ R < 4.95 μm |
| 5.0 μm | 4.95 μm ≦ R < 5.05 μm |
| . | . |

Control of average particle size and particle size distribution within the above-specified respective range can be properly varying the stirring speed, polymerization temperature or amount of a polymerizatin initiator or chain transfer agent in the polymerization process; operating feedback mechanism (a part of a polymerizaton liquid is returned to a monomer); by a method of using two polymerization vessels, in which prescribed amounts of the polymerization liquids, being different in degree of polymerization, are withdrawn and mixed together to complete polymerization; or the like technique.

It is also possible to obtain the abovespecified average particle size and size distribution by blending prescribed amounts of two or more kinds of rubber-modified styrene resins having different average particle sizes and size distributions.

Further, achievement of the object of this invention requires control of the elastomer content in the resin composition within the range between 5.0% and 10.0% by weight, preferably 5.0% and 7.5% by weight. If the content is less than 5.0%, the impact strength improving effect is very weak or is not manifested at all. On the other hand, if it exceeds 10.0%, the resulting resin composition exhibits reduced heat resistance or stiffness and is hardly applicable as a functional material.

Further, it is required that the resin matrix has an intrinsic viscosity [η] is at least 0.65 and preferably at least 0.7. If the intrinsic viscosity [η] of the resin matrix is less than 0.65, the stiffness is undesirably redused.

The intrinsic viscosity [0]of the resin matrix can be measured as follows. A 0.5 g portion of a sample resin composition is dissolved in 50 ml of a methyl ethyl ketone/methanol mixture (10:1 by volume). Any insoluble gel fraction is separated by centrifugation. The supernatant liquor is transferred to 1 l of methanol to allow the resinous component to reprecipitate. After filtration and drying, a portion of 100 mg of the precipitate is precisely weighed out and dissolved in 30 ml of toluene, followed by measurement at 30° C. by the use of a Ubbelohde's viscometer. The greater the intrinsic viscosity, the greater the molecular weight of the resin matrix.

It is furthermore required that the ratio of the swelling index [SI]of the soft component in toluene to the intrinsic viscosity [η] of the resin matrix (i.e., the portion of the resin composition except for the soft component) ([SI]/[η]) should range from 17 to 23, preferably from 19 to 22. If the ratio [SI]/[η] is either smaller than 17 or greater than 23, no impact strength improving effect can be produced, or the effect produced is very weak.

The terminology "swelling index [SI]" as used herein can be determined as follows. A 1.0 g portion of a sample resin composition is dissolved in 50 ml of toluene, and the insoluble gel fraction is precipitated by centrifugal separation and recovered by decantation. The thus recovered gel fraction is weighed while wet and, after drying, re-weighed. The swelling index [SI] can be defined by equation:

$$\text{Swelling Index} = \frac{W_1 - W_2}{W_2}$$

wherein $W_1$ represents a wet weight of the soft component; and $W_2$ represents a dry weight of the elastomer.

As the swelling index becomes greater, the soft component is considered to have a smaller degree of cross-linking and thereby be softer.

The present invention is now illustrated in greater detail with reference to the following Examples and Comparative Examples, but it should be understood that the present invention is not deemed to be limited thereto. In these examples, the Izod impact strength was measured according to JIS K7110 (corresponding to ASTM D-256).

EXAMPLE 1

Rubber-modified polystyrene (hereinafter referred to as HIPS) having an average particle size of a soft component of 0.2 μm and HIPS having that of 4.9 μm were blended at a weight ratio of 90/10, and the resulting resin composition was injection-molded to obtain test specimens.

The resulting resin was found to have an [SI]/[η] of 20.7 and an Izod impact strength as high as 11.4 kg·cm/cm.

EXAMPLE 2

HIPS having an average particle size of a soft component of 0.2 μm and HIPS having that of 4.9 μm were blended at a weight ratio of 75/25, and the resulting resin composition was injection-molded.

The resin was found to have an [SI]/[η] of 19.5 and an Izod impact strength as high as 11.3 kg·cm/cm.

EXAMPLE 3

HIPS having an average particle size of a soft component of 0.2 μm and HIPS having that of 4.2 μm were blended at a weight ratio of 50/50, and the resin composition was injection-molded.

The resulting resin was found to have an [SI]/[η] of 20.3 and an Izod impact strength as high as 11.1 kg·cm/cm.

COMPARATIVE EXAMPLE 1

HIPS having an average particle size of a soft component of 0.2 μm and HIPS having that of 4.2 μm were blended at a weight ratio of 5/95, and the resin composition was injection-molded. The resulting resin had an average particle size of 4.0 μm and an [SI]/[η] of 19.2 but was found to have an Izod impact strength as low as 8.1 kg·cm/cm.

COMPARATIVE EXAMPLE 2

HIPS having an average particle size of a soft component of 1.6 μm was injection-molded to obtain a test specimen. The specimen was found to have an SI]/[η] of 20.6. However, since the particle size distribution curve of the resin had only one peak, the Izod impact strength was as low as 7.3 kg·cm/cm.

COMPARATIVE EXAMPLE 3

HIPS having an average particle size of a soft component of 1.0 μm and HIPS having that of 1.6 μm were blended at a weight ratio of 25/75, and the resulting resin composition was injection-molded. The resin was found to have an average particle size of 1.5 μm and an SI]/[η] of 19.4. However, since the particle size distribution curve had its two peaks both in the range of not less than 0.8 μm, the Izod impact strength was as low as 7.4 kg·cm/cm.

COMPARATIVE EXAMPLE 4

HIPS having an average particle size of a soft component of 0.2 μm and HIPS having that of 1.0 μm were blended at a weight ratio of 10/90, and the resulting resin composition was injection-molded. The specimen had an average particle size of 0.9 μm and two peaks of particle size distribution curve, one in the range of less than 0.8 μm and the other in the range of not less than 0.8 μm. However, the Izod impact strength was as low as 7.0 kg·cm/cm because the [SI]/[η] was as small as 16.5.

The results of Examples 1 to 3 and Comparative Examples 1 to 4 are summarized in Table 2 below.

TABLE 2

|  | Example No. | | | Comparative Example No. | | | |
| --- | --- | --- | --- | --- | --- | --- | --- |
|  | 1 | 2 | 3 | 1 | 2 | 3 | 4 |
| Average Particle Size of Soft Component (μm) | 0.7 | 1.4 | 2.2 | 4.0 | 1.6 | 1.5 | 0.9 |
| Max. of Particle Size Distribution of Soft Component (μm) | 0.2 / 4.9 | 0.2 / 4.9 | 0.2 / 4.2 | 0.2 / 4.2 | 1.6 | 1.0 / 1.6 | 0.2 / 1.0 |
| Intrinsic Viscosity of Resin Matrix [η] | 0.69 | 0.73 | 0.65 | 0.63 | 0.63 | — | — |
| [SI]/[η] | 20.7 | 19.5 | 20.3 | 19.2 | 20.6 | 19.4 | 16.5 |
| Elastomer Content (wt %) | 8.2 | 8.0 | 8.7 | 8.9 | 6.1 | 6.3 | 7.1 |
| Izod Impact Strength* (kg · cm/cm) | 11.4 | 11.3 | 11.1 | 8.1 | 7.3 | 7.4 | 7.0 |

Note:
*6.4 mm (t) notched at 23° C.

EXAMPLES 4 TO 5 AND COMPARATIVE EXAMPLES 5 TO 6

The same resin composition as used in Example 1 and a polystyrene resin containing no elastomer (GPPS) having the same intrinsic viscosity as that of the resin composition of Example 1 were blended at a weight ratio of from 90/10 to 50/50, and the resulting composition was injection-molded. The results of measurements on the specimen are shown in Table 3.

TABLE 3

|  | Example No. | | Comparative Example No. | |
| --- | --- | --- | --- | --- |
|  | 4 | 5 | 5 | 6 |
| Blending ratio (by weight): | | | | |
| HIPS | 90 | 80 | 60 | 50 |
| GPPS | 10 | 20 | 40 | 50 |
| [SI]/[η] | 20.7 | 20.7 | 20.7 | 20.7 |
| Elastomer Content (wt %) | 7.4 | 6.6 | 4.9 | 4.1 |
| Izod Impact Strength* (kg · cm/cm) | 10.0 | 9.2 | 7.0 | 5.0 |

Note:
*6.4 mm (t) notched at 23° C.

EXAMPLE 6

HIPS having an average particle size ($D_1$) of a soft component of 0.2 μm and HIPS having that ($D_2$) of 4.9 μm were blended at a weight ratio of 95/5, and the resulting resin composition was injection-molded.

The resin was found to have a Dhd 2/$D_1$ of 24.5, an average particle size of 0.4 μm, and an Izod impact strength as high as 11.3 kg·cm/cm.

EXAMPLE 7

HIPS having an average particle size ($D_1$) of a soft component of 0.2 μm and HIPS having that ($D_2$) of 2.4 μm were blended at a weight ratio of 75/25, and the resulting resin composition was injection-molded.

The resin was found to have a $D_2/D_1$ of 12, an average particle size of 1.3 μm, and an Izod impact strength as high as 10.8 kg·cm/cm.

COMPARATIVE EXAMPLE 7

HIPS having an average particle size of a soft component of 0.2 μm as used in Examples 6 and 7 had only one peak in particle size distribution curve and was found to have an Izod impact strength as low as 7.0 kg·cm/cm.

COMPARATIVE EXAMPLE 8

HIPS having an average particle size of a soft component of 4.9 μm as used in Example 6 had only one peak in particle size distribution curve and was found to have an Izod impact strength as low as 7.6 kg·cm/cm.

COMPARATIVE EXMAPLE 9

HIPS having an average particle size ($D_1$) of a soft component of 0.2 μm and HIPS having that ($D_2$) of 1.0 μm were blended at a weight ratio of 75/25, and the resulting resin composition was injection-molded.

The resin was found to have an average particle size of 0.4 μm. However, since the $D_2/D_1$ value (i.e., 5) is outside the scope of this invention, the Izod impact strength was as low as 6.9 kg·cm/cm.

COMPARATIVE EXAMPLE 10

HIPS having an average particle size ($D_1$) of a soft component of 0.2 μm and HIPS having that ($D_2$) of 6.5 μm were blended at a weight ratio of 90/10, and the resulting resin composition was injection-molded.

The resin was found to have an average particle size of 0.8 μm. However, since the $D_2/D_1$ value (i.e., 32) is Outside the scope of this invention, the Izod impact strength was as low as 7.5 kg·cm/cm.

COMPARATIVE EXAMPLE 11

HIPS having an average particle size ($D_1$) of a soft component of 0.2 μm and HIPS having that ($D_2$) of 4.2 μm were blended at a weight ratio of 5/95, and the resulting resin composition was injection-molded.

The resin was found to have a $D_2/D_1$ of 21. However, since the average particle size was 4 μm, which value is outside the scope of this invention, the Izod impact strength was as low as 8.1 kg·cm/cm.

The results of Examples 6 to 7 and Comparative Examples 7 to 11 are summarized in Table 4 below.

TABLE 4

|  | Example No. | | Comparative Example No. | | | | |
|---|---|---|---|---|---|---|---|
|  | 6 | 7 | 7 | 8 | 9 | 10 | 11 |
| Particle Size Distribution | two peaks | two peaks | one peak | one peak | two peaks | two peaks | two peaks |
| $D_1$ (μm) | 0.2 | 0.2 | — | — | 0.2 | 0.2 | 0.2 |
| $D_2$ (μm) | 4.9 | 2.4 | — | — | 1.0 | 6.5 | 4.2 |
| $D_2/D_1$ | 24.5 | 12 | — | — | 5 | 32.5 | 21 |
| Average particle Size (μm) | 0.4 | 1.3 | 0.2 | 4.9 | 0.4 | 0.8 | 4.0 |
| Elastomer Content (wt %) | 8.3 | 8.0 | 8.4 | 6.8 | 8.1 | 8.3 | 8.9 |
| Izod Impact Strength* (kg·cm/cm) | 11.3 | 10.8 | 7.0 | 7.6 | 6.9 | 7.5 | 8.1 |

Note:
*6.4 mm (t) notched at 23° C.

EXAMPLES 8 TO 9 COMPARATIVE EXAMPLES 12 TO 13

The styrene resin composition as produced in Example 6 and GPPS having the same intrinsic viscosity as that of the resin composition of Example 6 were blended at a weight retio of HIPS to GPPS as shown in Table 5, and the resulting composition was injection-molded. The results of mesurements on the specimen are shown in Table 5.

TABLE 5

|  | Example No. | | | Comparative Example No. | |
|---|---|---|---|---|---|
|  | 6 | 8 | 9 | 12 | 13 |
| Blending Ratio (by weight): | | | | | |
| HIPS | 100 | 90 | 80 | 55 | 50 |
| GPPS | 0 | 10 | 20 | 45 | 50 |
| Elastomer Content (wt %) | 8.3 | 7.5 | 6.6 | 4.6 | 4.2 |
| Izod Impact Strength* (kg·cm/cm) | 11.3 | 10.3 | 9.5 | 5.0 | 4.5 |

Note:
*6.4 mm (t) notched at 23° C.

EXAMPLE 10

HIPS Grade A having an average particle size of 0.2 μm and a particle size distribution such that particles of 0.5 μm or less accounted for 71%, particles of 1.0 μm or less accounted for 80%, and particles of 2.5 μm or more accounted for 12%, respectively and HIPS Grade B having an average particle size of 4.9 μm and a particle size distribution such that particles of 0.5 μm or less accounted for 0%, particles of 1.0 μm or less accounted for 2.6%, and particles of 2.5 μm or more accounted for 93%, respectively were blended at a weight ratio of 90/10, and the resulting resin composition was injection-molded.

The resin had a soft component having an average particle size of 0.7 μm and a particle size distribution such that particles of 0.5 μm or less accounted for 64%, particles of 1.0 μm or less accounted for 72%, and particles of 2.5 μm or more accounted for 20%, respectively and was found to have an Izod impact strength as high as 11.4 kg·cm/cm.

EXAMPLE 11

HIPS Grade A and HIPS Grade B as used in Example were blended at a weight ratio of 75/25, and the resulting resin composition was injection-molded.

The resin had a soft component having an average particle size of 1.4 μm and a particle size distribution such that particles of 0.5 μm or less accounted for 53%, particles of 1.0 μm or less accounted for 61%, and particles of 2.5 μm or more accounted for 32%, respectively and was found to have an Izod impact strength as high as 11.1 kg·cm/cm.

EXAMPLE 12

HIPS Grade A as used in Example 10 and HIPS Grade C having an average particle size of 4.2 μm and a particle size distribution such that particles of 0.5 μm or less accounted for 0%, particles of 1.0 μm or less accounted for 0.7%, and particles of 2.5 μm or more accounted for 89%, respectively were blended at a weight ratio of 50/50, and the resulting resin composition was injection-molded.

The resin had a soft component having an average particle size of 2.2 μm and a particle size distribution such that particles of 0.5 μm or less accounted for 35%, particles of 1.0 μm or less accounted for 41%, and particles of 2.5 μm or more accounted for 50%, respectively and was found to have an Izod impact strength as high as 11.1 kg·cm/cm.

COMPARATIVE EXAMPLE 14

HIPS Grade A as used in Example 10 and HIPS Grade D having an average particle size of 1.0 μm and a particle size distribution such that particles of 0.5 μm or less accounted for 0%, particles of 1.0 μm or less accounted for 47%, and particles of 2.5 μm or more accounted for 7%, respectively were blended at a weight ratio of 60/40, and the resulting resin composition was injeciton-molded.

The resin had a soft component having an average particle size of 0.5 μm and a particle size distribution such that particles of 0.5 μm or less accounted for 43%, particles of 1.0 μm or less accounted for 67%, and particles of 2.5 μm or more accounted for 10%, respectively and was found to have an Izod impact strength as low as 6.8 kg·cm/cm because the particle size distribution is outside the scope of this invention.

COMPARATIVE EXAMPLE 15

HIPS Grade C as used in Example 12 and HIPS Grade D as used in Comparative Example 14 were blended at a weight ratio of 15/85, and the resulting resin composition was injection-molded.

The resin had a soft component having an average particle size of 1.5 μm and a particle size distribution such that particles of 0.5 μm or less accounted for 0%, particles of 1.0 μm or less accounted for 40%, and particles of 2.5 μm or more accounted for 20%, respectively and was found to have an Izod impact strength as low as 8.3 kg·cm/cm because the paraticle size distribution is outside the scope of this invention.

COMPARATIVE EXAMPLE 16

HIPS Grade A as used in Example 10 and HIPS Grade E having an average particle size of 2.4 μm and a particle size distribution such that particles of 0.5 μm or less accounted for 0%, particles of 1.0 μm or less accounted for 1%, and particles of 2.5 μm or more accounted for 45%, respectively were blended ast a weight ratio of 45/55, and the resulting resin composition was injection-molded.

The resin had a soft component having an average particle size of 1.4 μm and a particle size distribution such that particles of 0.5 μm or less accounted for 32%, particles of 1.0 μm or less accounted for 37%, and particles of 2.5 μm or more accounted for 30%, respectively and was found to have an Izod impact strength as low as 7.4 kg·cm/cm because the paraticle size distribution is outside the scope of this invention.

The results of Examples 10 to 12 and Comparative Examples 14 to 16 are summarized in Table 6 below.

TABLE 6

| | Example No. | | | Comparative Example No. | | |
|---|---|---|---|---|---|---|
| | 10 | 11 | 12 | 14 | 15 | 16 |
| Particle Size Distribution of Soft Component: | | | | | | |
| ≦ 0.5 μm | 64% | 53% | 35% | 43% | 0% | 32% |
| ≦ 1.0 μm | 72% | 61% | 41% | 67% | 40% | 37% |
| ≧ 2.5 μm | 20% | 32% | 50% | 10% | 20% | 30% |
| Elastomer Content (wt %) | 8.2 | 8.0 | 8.7 | 7.8 | 7.3 | 7.6 |
| Izod Impact Strength* (kg · cm/cm) | 11.4 | 11.1 | 11.1 | 6.8 | 8.3 | 7.4 |

Note:
*6.4 mm (t) notched at 23° C.

EXAMPLE 13 TO 14 AND COMPARATIVE EXAMPLE 17 TO 18

The styrene resin composition as produced in Example 10 and GPPS having the same intrinsic viscosity as that of the resin composition of Example 10 were blended at a weight ratio of HIPS to GPPS as shown in Table 7, and the resulting composition was injection-molded. The results of measurements on the specimen are shown in Table 7.

TABLE 7

| | Example No. | | | Comparative Example No. | |
|---|---|---|---|---|---|
| | 10 | 13 | 14 | 17 | 18 |
| Blending Ratio (by weight): | | | | | |
| HIPS | 100 | 90 | 80 | 60 | 50 |
| GPPS | 0 | 10 | 20 | 40 | 50 |
| Elastomer Content (wt %) | 8.2 | 7.4 | 6.6 | 4.9 | 4.1 |
| Izod Impact Strength* (kg · cm/cm) | 11.4 | 10.0 | 9.2 | 7.0 | 5.0 |

Note:
*6.4 mm (t) notched at 23° C.

EXAMPLES 15 TO 16 AND COMPARATIVE EXAMPLES 19 TO 26

Seven kinds of HIPS's A to G having a particle size of a soft component, an elastomer content and an [η] as shown in Table 8 were prepared, and these resins were blended at a weight ratio as shown in Table 9.

The results of measurements of these resin compositions regarding particle size distribution and average particle size of soft component, elastomer content, [η] of matrix, Izod impact strength, flexural modulus, and gloss (at 45°) are shown in Table 10.

TABLE 8

| | Type of HIPS | | | | | | |
|---|---|---|---|---|---|---|---|
| | A | B | C | D | E | F | G |
| Particle Size of Soft Component (μm) | 0.2 | 4.9 | 4.2 | 2.4 | 1.0 | 6.5 | 0 |
| Elastomer Content (wt %) | 8.4 | 6.2 | 8.9 | 7.0 | 5.7 | 6.0 | 0 |
| [η] | 0.69 | 0.98 | 0.62 | 0.62 | 0.73 | 0.90 | 0.87 |

TABLE 9

| | Blending Ratio (by weight) Type of HIPS | | | | | | |
|---|---|---|---|---|---|---|---|
| | A | B | C | D | E | F | G |
| Example 15 | 72 | 8 | — | — | — | — | 20 |
| Example 16 | 63 | — | 7 | — | — | — | 30 |
| Comparative Example 19 | 100 | — | — | — | — | — | — |
| Comparative Example 20 | 75 | 25 | — | — | — | — | — |
| Comparative Example 21 | 41 | 5 | — | — | — | — | 54 |
| Comparative Example 22 | 25 | — | — | 75 | — | — | — |
| Comparative Example 23 | 60 | — | — | — | 20 | — | 20 |
| Comparative Example 24 | 64 | — | — | — | — | 16 | 20 |
| Comparative Example 25 | 2.5 | — | 47.5 | — | — | — | 50 |
| Comparative Example 26 | — | 25 | — | — | 75 | — | — |

TABLE 10

| | Example No. | | Comparative Example No. | | | | | | | |
|---|---|---|---|---|---|---|---|---|---|---|
| | 15 | 16 | 19 | 20 | 21 | 22 | 23 | 24 | 25 | 26 |
| Particle size Distribution of Soft Component Distribution Stete | two peaks | two peaks | one peak | two peaks | two peaks | two peaks | two peaks | two peaks | two peaks | two peaks |
| $D_1$ (μm) | 0.2 | 0.2 | 0.2 | 0.2 | 0.2 | 0.2 | 0.2 | 0.2 | 0.2 | 1.0 |
| $D_2$ (μm) | 4.9 | 4.2 | — | 4.9 | 4.9 | 2.4 | 1.0 | 6.5 | 4.2 | 4.9 |
| $D_2/D_1$ | 24.5 | 21.0 | — | 24.5 | 24.5 | 12.0 | 5.0 | 32.5 | 21.0 | 4.9 |
| Average Particle Size of Soft Component (μm) | 0.7 | 0.6 | 0.2 | 1.4 | 0.7 | 1.9 | 0.4 | 1.5 | 4.0 | 2.0 |
| Elastomer Content (wt %) | 6.5 | 5.9 | 8.4 | 7.9 | 3.8 | 7.4 | 6.2 | 6.3 | 4.4 | 5.8 |
| [η] of Matrix | 0.75 | 0.74 | 0.69 | 0.76 | 0.80 | 0.64 | 0.73 | 0.76 | 0.75 | 0.79 |
| Izod Impact Strength[1] (kg · cm/cm) | 10.0 | 9.3 | 7.0 | 9.5 | 5.0 | 8.5 | 5.7 | 5.8 | 4.3 | 7.3 |
| Flexural Modulus[2] (kg/cm²) | 20,000 | 20,700 | 17,200 | 17,500 | 23,800 | 17,300 | 20,400 | 19,600 | 22,200 | 21,000 |
| Gloss[3] (at 45°) (%) | 102 | 102 | 100 | 79 | 104 | 70 | 104 | 75 | 45 | 60 |

[Note]
[1]According to ASTM D256, 6.4 mm (t) notched at 23°.
[2]According to ASTM D790.
[3]Shape of molded article: oval and spiral shape (open), mold: 40° C., distance from the gate: 110 mm As stated above, the resin composition in accordance with the present invention exhibits markedly high impact strength and, therefore, can be used as a substitute for ABS resin used in housings of appliances or various containers. Thus, the present invention makes a great contribution to reduction of cost.

While the invention has been described in detail and with reference to specific embodiments thereof, it will be apparent to one skilled in the art that various changes and modifications can be made therein without departing from the spirit and scope thereof.

What is claimed is:

1. A rubber-modified styrene resin composition comprising:
   (1) a resin matrix having an intrinsic viscosity ($\eta$) of at least 0.65; and
   (2) soft component particles dispersed in said resin matrix, said soft component particles comprising
      (a) an elastomer present in an amount of from 5.0 to 10.0% by weight based on said resin composition, and
      (b) occlusions of said resin matrix dispersed in said elastomer;
   where said soft component particles have an average particle size of from 0.2 to 2.6 microns, and a particle size distribution having two maxima, one in a range less than 0.8 microns and the other in a range not less than 0.8 microns.

2. A rubber-modified styrene resin composition as claimed in claim 1, wherein the ratio of the swelling index [SI] of the soft component in toluene to the intrinsic viscosity [$\eta$] of the resin matrix ([SI]/[$\eta$]) ranges from 17 to 23.

3. A rubber-modified styrene resin composition as claimed in claim 1, wherein the soft component is satisfied with the following relationship:

$$10 \leq D_2/D_1 \leq 30$$

wherein $D_1$ represents a maximum particle diameter of the particle having a smaller particle size, and $D_2$ represents a maximum particle size.

4. A rubber-modified styrene resin composition as claimed in claim 1, wherein the soft component has such a particle size distribution that particles having a particle size of 0.5 μm or less account for 30% or more but less than 70%, particles having a particle size of 1.0 μm or less account for 40% or more but less than 75%, and particles having a particle size of 2.5 μm or more account for 20% or more but less than 55%, respectively.

5. A rubber-modified styrene resin composition as claimed in claim 1, wherein the elastomer is composed of polybutadiene, and the resin matrix is composed of polystyrene.

6. A rubber-modified styrene resin composition as claimed in claim 1, wherein the resin matrix has an intrinsic viscosity $[\eta]$ of at least 0.7, and the elastomer is present in an amount of from 5.0 to 7.5% by weight based on the resin composition.

* * * * *